Figure 1:
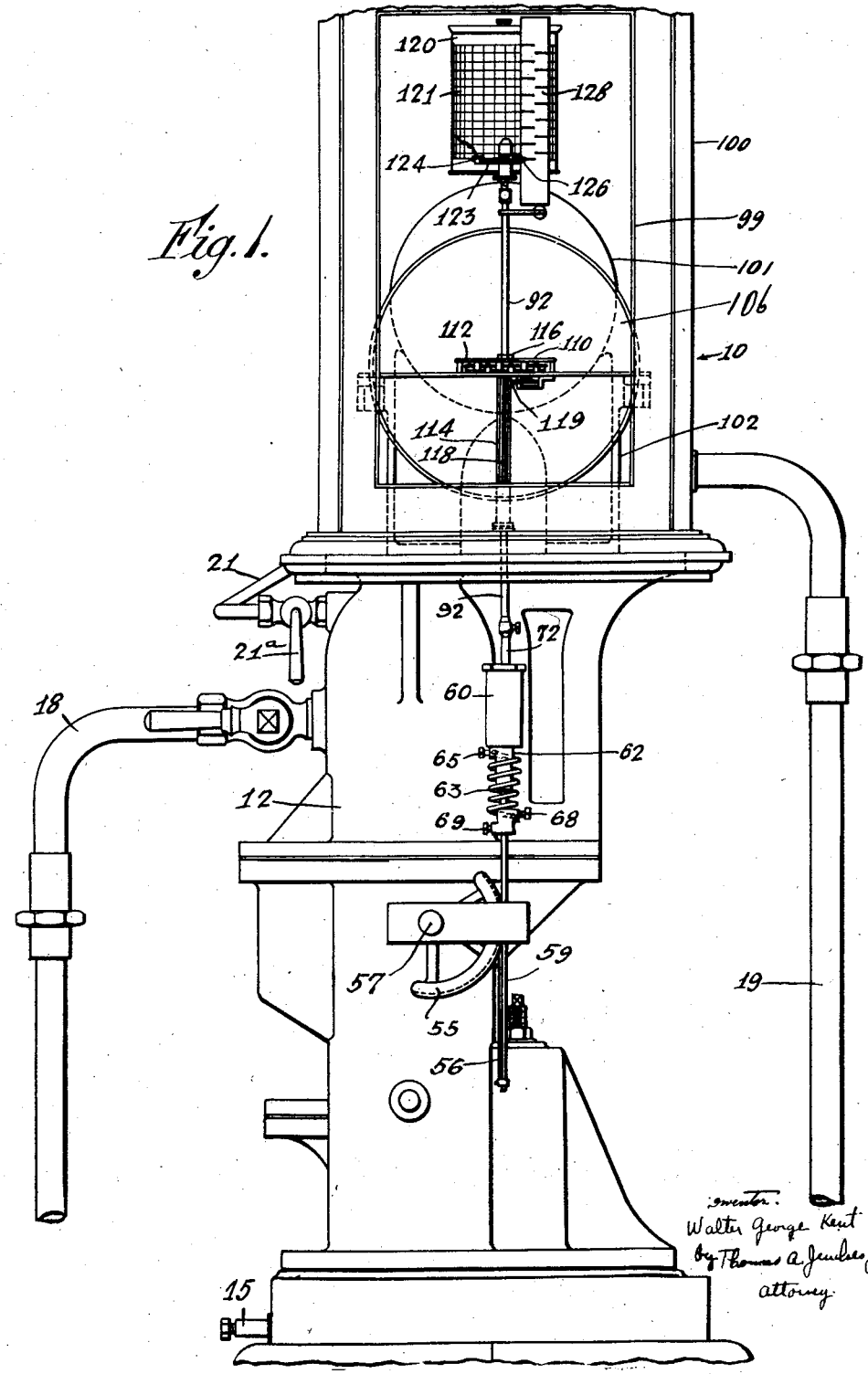

June 21, 1927.

W. G. KENT
LIQUID METER
Filed April 2, 1923

1,633,532

4 Sheets-Sheet 1

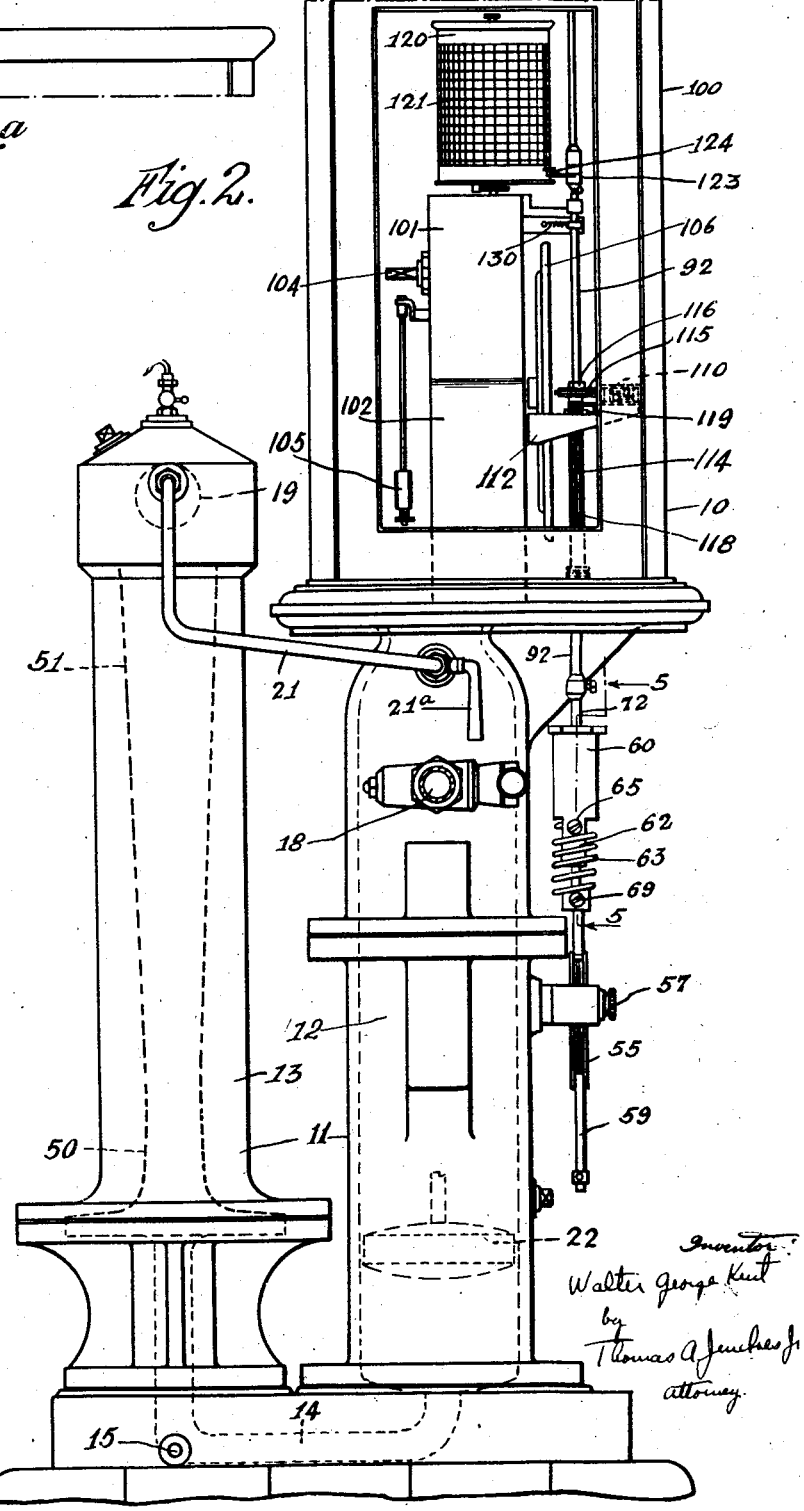

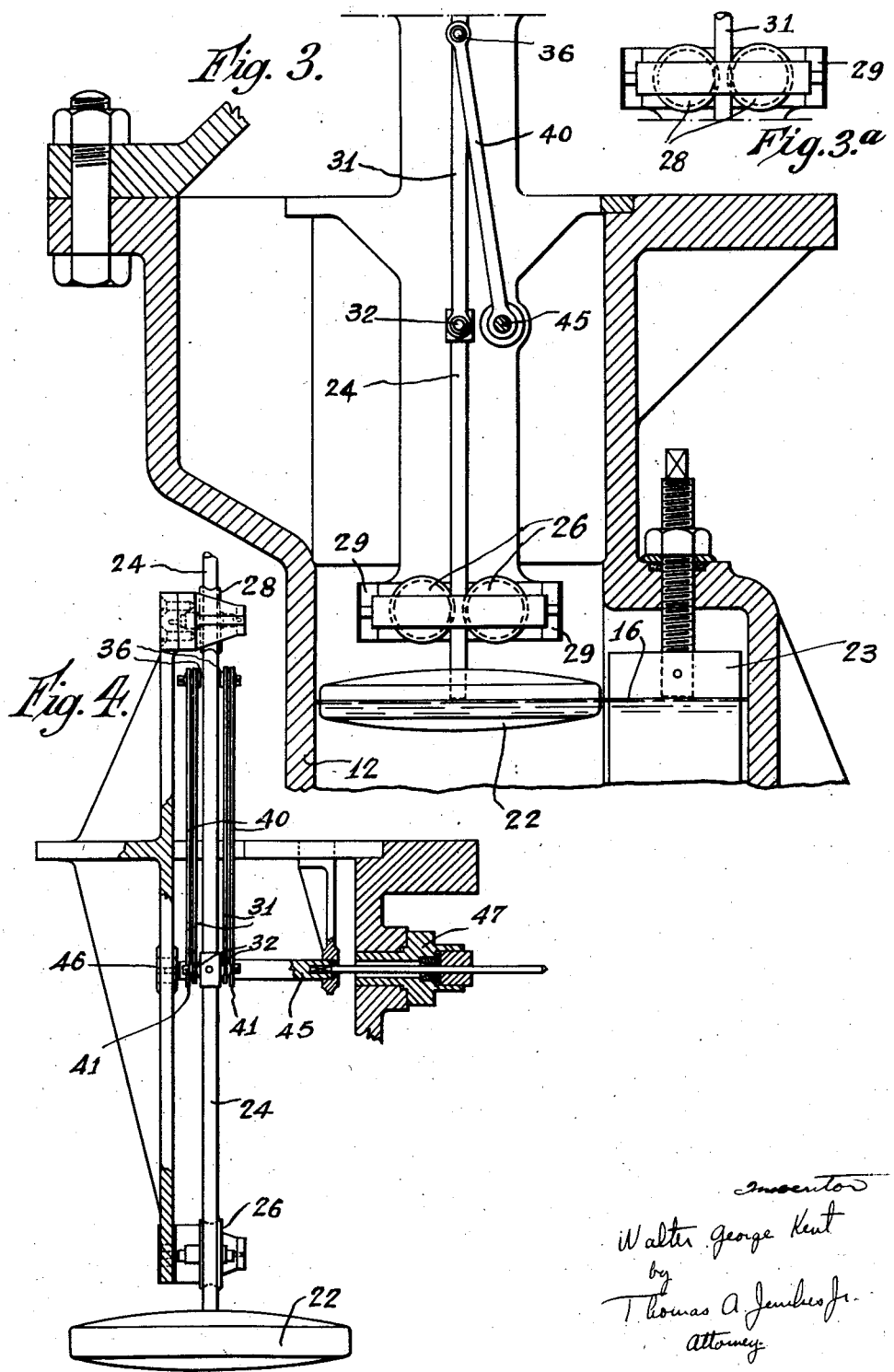

June 21, 1927.
W. G. KENT
1,633,532
LIQUID METER
Filed April 2, 1923
4 Sheets-Sheet 4
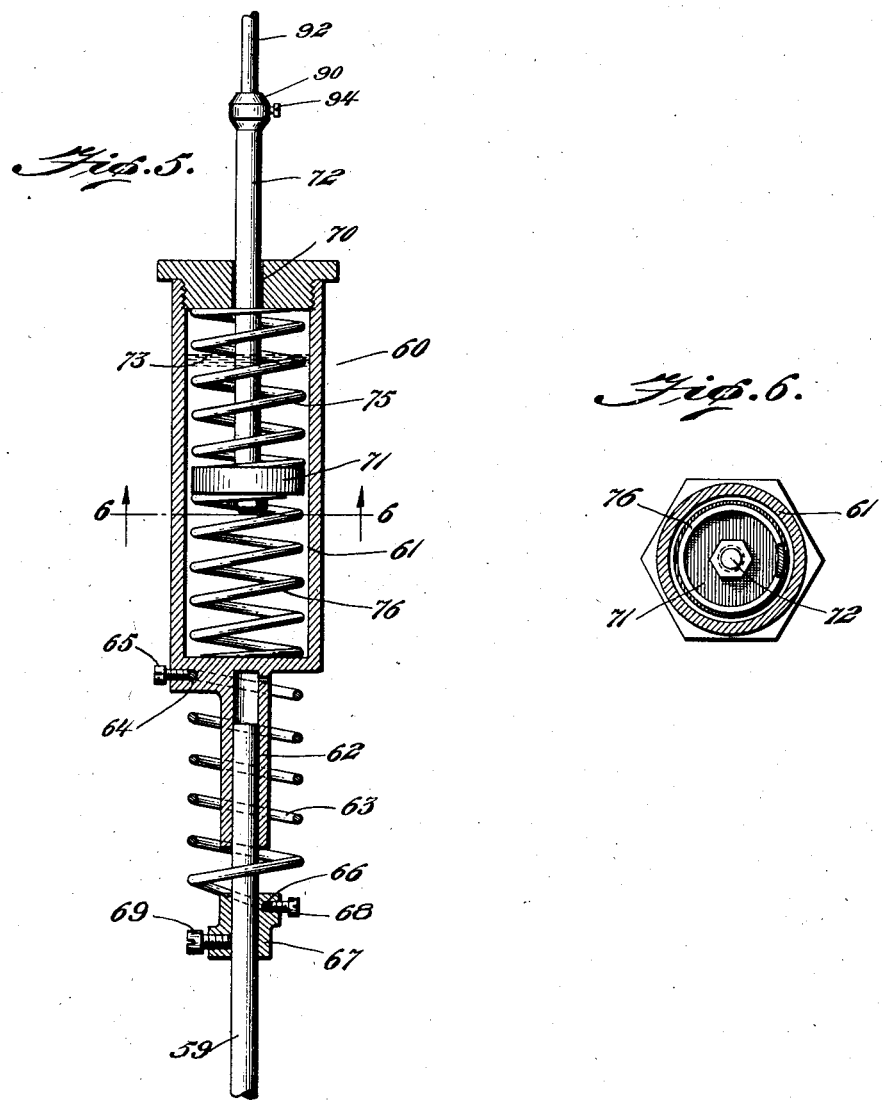

Patented June 21, 1927.

1,633,532

UNITED STATES PATENT OFFICE.

WALTER GEORGE KENT, OF LONDON, ENGLAND.

LIQUID METER.

Application filed April 2, 1923, Serial No. 629,359, and in Great Britain April 5, 1922.

This invention relates to improvements in liquid meters of the type in which there is inserted in the pipe conveying the liquid to be measured a constriction, orifice, Pitot tube or other device, from which different pressures can be conveyed to the two legs of U tube in which is a liquid such as mercury with a float resting upon the mercury in one leg and carrying a rod which actuates a pen for producing a diagram, or integrating mechanism or both.

According to this invention I connect the float rod by a link to an arm on a spindle which passes out through the wall of the mercury chamber or U tube and by its rotation actuates a rod carrying the record pen or planimeter wheel or both: when the pressure difference is small the link and arm are nearly coincident so that the angle through which the spindle is turned by a small movement of the float is large when the pressure difference is small, and the angle through which the spindle is turned by an equal movement of the float diminishes as the pressure difference increases. I preferably mount on the spindle outside the mercury chamber a cam round which is wrapped a light flexible band which supports the lower end of the rod carrying the pen and/or planimeter wheel. Also I preferably so shape one or both of the legs of the U tube that the movement of the float is at its maximum for the lowest pressure differences.

In order also that such a meter may be suitable for measuring a rapidly fluctuating flow such as occurs when measuring the rate of feed to a boiler and the rate of flow of the condensate water, I preferably insert in the rod carrying the pen and/or planimeter wheel a dashpot; this I do by dividing the rod into two portions and connecting the lower portion to a dashpot by a spiral spring, while the upper portion is connected to the piston of the dashpot, which is held centrally by springs in the dashpot. It is obvious, however, that the dashpot and spring may be located anywhere between the indicating mechanism and its actuating means.

By this device any very sudden or violent fluctuations of the pressure difference are absorbed before the resultant motion reaches the recording mechanism.

By this invention I obtain the maximum of power with the minimum quantity of mercury in the U tube and an equally spaced movement giving the correct mean registration instead of a movement due to the mean pressure difference, whilst friction in the whole apparatus is reduced to a minimum and violent fluctuations in the mercury level are damped out.

While I am aware that hitherto the legs of the U tubes have been shaped to proportion the movements of the indicating or the recording means to the rate of flow, so far as I am aware I am the first to provide the combination of the link and arm mechanism described above with a modified U tube to accurately proportion said movement, especially when the pressure difference is small.

These and such other objects of my invention as may hereinafter appear will be best understood from a description of one embodiment thereof, such as is shown in the accompanying drawings of a standard Venturi meter register.

My invention is illustrated by the accompanying drawings, Figure 1 of which is a side view and Figure 2 a front view, Fig. 2ª being an extension of Fig. 2 indicating the portion of the apparatus above the marginal line on the sheet, while Figure 3 is an enlarged section through part of the float leg of the U tube, Figure 3ª being an extension of Figure 3 indicating the portion of the apparatus shown above the marginal line on the sheet, Figure 4 is a view at right angles to Figure 3, Figure 5 is an enlarged sectional view taken along the line 5—5 of Figure 2, and Figure 6 is a sectional view taken along the line 6—6 of Figure 5.

In the drawings, wherein like characters of reference indicate like parts throughout, 10 generally indicates a register of a standard type for fluid meters of the venturi or like type. Said register 10 normally contains a U tube 11 having the two legs 12 and 13 projecting upwards, and the base 14 thereof connecting said legs. I employ the term "U tube" to cover any device suitable for this purpose having two legs or chambers suitable for containing the working liquid 16 which is preferably mercury and a pipe 14 or other means for connecting the liquid in these two chambers or legs, whether the whole is strictly speaking of true "U-shape" or otherwise.

The pipe 18 connects the top of the leg 12 with the up-stream end of a Venturi tube, and the pipe 19 connects the top of the leg 13 with the throat of a Venturi tube (not shown), though it is obvious that these pipes may be connected to any suitable metering pressure difference producer. In the embodiment shown a drain cock 15 is normally provided in the pipe 14, and a by pass line 21 containing the valve 21ᵃ connects the legs 12 and 13 to equalize the pressure between them when the valve 21ᵃ is opened. A float 22 (Fig. 3) normally rides on the liquid 16 contained in the leg 12. A displacement plunger 23 is adjustably mounted in the leg 12 to vary the height of the liquid 16 therein when desired. Said float 22 has a rod 24 projecting upwards therefrom. This rod 24 is preferably constrained to reciprocate in a vertical direction only by two pairs of guide rollers 26 and 28 suitably mounted in brackets 29 attached to the interior of the leg 12.

A pair of links 31 are suitably pivoted to lugs 32 projecting from each side of the rod 24. The outer ends of said links 31 are pivotally connected to the outer ends of the arms 40 by the pivot pins 36. The arms 40 are provided at their opposite ends with the collars 41 which are adapted to be firmly secured to a spindle or shaft 45 which is revolvably mounted in bearings 46 attached to the leg 12. The stuffing box 47 is provided for said shaft 45 to seal said leg 12. In the embodiment shown, the spindle 45 projects through the side of the leg 12. It is obvious that variations of pressure difference between the up-stream end and throat of the Venturi tube will cause the liquid 16 to flow proportionately from the leg 12 to the leg 13 and vice versa, and when there is no fluid flowing through the conduit the float 22 will be in zero position. Acting through the medium of the apparatus above described, variation in the rate of flow will thus cause the oscillating movement of the spindle 45. Due to the arm and link connection above described, it is obvious that the angle through which the spindle 45 is turned in consequence of a small movement of the float 22 from the zero position of Fig. 3 is large as compared with the angle through which the spindle 45 will be turned by the same movement of the float 22 when the difference between the up-stream and throat pressure is large, which will considerably lessen the modification of shape of the U tube necessary to provide for movement of the indicating means proportionate to the rate of flow.

To accurately proportion the movement of the spindle 45 to the rate of flow, the leg 13 of the U tube is shaped as shown in dotted lines in Fig. 2 contracting rapidly at 50 near its base. This assists the action produced by the link and arm mechanism described above in permitting large movement of the float for small variations of pressure difference when the pressure difference is small. Toward the upper end of the leg 13 the bore increases slowly as shown at 51 to increase the movements of the float 22 because at large pressure differences the aforedescribed movement of the spindle 45 due to the link and arm mechanism is smaller than it should be for correct registration.

To transmit the movement of the spindle 45 to the indicating and recording mechanism I provide the mechanism to be described. A cam 55 is mounted on said leg 12 so as to be actuated by the spindle 45. One end of a flexible band 56 is attached to the outer periphery of said cam 55, so as to permit wrapping of said band 56 around the outer periphery of said cam. The outer end of said band 56 is attached to the rod 59 which may reciprocate in one direction preferably vertically and which carries means for indicating and integrating its motion later to be described.

In the preferred embodiment shown, I resiliently connect said indicating means with the actuating mechanism thereof so as to permit the actuating mechanism to follow rapid fluctuations in the rate of flow without imparting them to the indicating mechanism, and I provide in further combination therewith means to dampen the movement of the indicating means. Though I have shown in my preferred embodiment a mercury U tube as an integral part of the indicating means actuating mechanism, it is obvious that in so far as my invention includes the combination of an indicating means resiliently connected to its actuating mechanism with a dampening means for said indicating means, that any suitable indicating means actuating mechanism such as a diaphragm, etc. may be employed. Though I have shown a spring as the preferred embodiment of the resilient means to connect the indicating means having a movement substantially proportionate to the rate of flow with its actuating mechanism, it is obvious that an electric or other resilient connecting means may be employed. It is also apparent that although a piston and dashpot have been provided in the preferred embodiment for dampening the motion of the indicating means, electromagnetic or other suitable dampening means may be employed. Said means in the embodiment shown are provided as follows: The cam 55 is securely mounted on the shaft 45 near the outer end thereof, the shaft 45 being held in position by the thrust bearing 57. As stated previously I provide means to dampen the movement of the rod 59 which is connected to the indicating means as about to be explained. In the preferred embodiment shown this comprises a dashpot 60. The cylinder 61 of said dashpot 60 has a hollow sleeve 62 projecting downwards therefrom, in which the upper end of the rod 59 may reciprocate. I preferably resiliently connect the upper end of the rod 59 to the base of the cylinder 61 of the dashpot 60 by the spiral spring 63, one end of said spiral spring being preferably secured to the base of the cylinder 61 by registering in the hole 64 provided therein therefor and being secured therein by the screw 65 and the opposite end of said spiral spring 63 registering in a hole 66 therefor in the collar 67 and being retained therein by the screw 68, said collar 67 being secured to the upper end of the rod 59 by the screw 69. The upper end of said dashpot 61 is provided with the piston hole 70. The lower extremity of the indicating rod 92 is preferably enlarged as at 71 to form the piston head, the lower end 72 of said rod thus forming the piston of said dash pot 60 and being adapted to reciprocate through the hole 70. In my preferred embodiment I have shown the piston rod 72 for purposes of assembly and adjustment as detachable from the indicating rod 92 by means of sleeve and collar construction 90 and set screw 94. The dashpot contains the usual working liquid 73, preferably oil. The piston head 71 which may be considered as the lower end of the indicating rod 92 is preferably held centrally of the dashpot 60 by the springs 75 and 76, the upper spring 75 abutting the upper end of the piston head 71 and the upper end of the piston cylinder 61, and the lower spring 76 abutting the lower end of the piston 71 and the lower end of the piston cylinder 61. The spindle 45 thus operates to actuate the indicating rod 92 as follows: On decrease in the rate of flow and hence decrease in the pressure differential produced, the liquid 16 in the leg 12 will rise forcing the float 22 up with it. This will revolve the spindle 45, said movement being transmitted through the cam 55 and band 56 to raise the rod 59. The rod 59 being resiliently attached to the dashpot 60 by means of the spiral spring 63 will force the dashpot 60 upwards which through the medium of the spiral springs 75 and 76 therein and the fluid 73 of the dashpot 60 will raise the piston head 71 of the piston rod 72 thereby forcing the indicating rod 92 upwards. It is obvious that the springs 63, 75 and 76 will absorb any violent fluctuations in the movement of the rod 59 and the fluid 73 of the dashpot 60 will tend to dampen the movement of the indicating rod 92. On increase of rate of flow it is obvious that the reverse of this operation will take place, the springs functioning to absorb any violent fluctuations and the dashpot 60 to dampen the movement of the indicating rod 92. It is thus obvious that by means of the resilient connection between the indicating rod 92 and the actuating spindle 45 and the dampening mechanism interposed therebetween, that any very sudden or violent fluctuation of the pressure differential is absorbed before the resultant motion reaches the recording mechanism.

The indicating and recording mechanism is of the standard type used in registers, and functions in the usual manner and so I will just briefly refer to the parts shown. The register box 100 having the usual windows 99 is mounted as usual on top of the leg 12. The clock 101 is suitably mounted on the frame 102 therein. 104 illustrates the winding mechanism of the clock 101 and 105 the pendulum thereof suitably connected thereto. The clock 101 revolves the integrating disk 106. The integrating mechanism 110 is mounted on the frame 112 permanently secured on the box 100. The integrating wheel 115 is mounted on a sleeve 114 rotatably mounted on the rod 92 and secured thereto against up and down movement by the nut 116. The sleeve 114 projects downwardly a distance and has its major length toothed at 118 for a purpose to be described. The integrating wheel 115 is driven by contact with the integrating disk 106, which in turn drives the integral sleeve 114. The toothed portion 118 of the sleeve 114 drives the gear 119 which in turn drives the integrating mechanism 110. It is obvious that the speed at which the integrating mechanism 110 is driven will depend on the position of the wheel 115 on the disk 106, and that the length of the toothed portion 118 will at all times permit it to drive the gear 119 of the integrating mechanism.

The graphical recording mechanism includes the drum 120 revolved at the desired speed by the clock 101. Chart paper 121 is suitably placed around said drum. The member 123 is adjustably secured to the upper portion of the rod 92. Said member 123 has a pen 124 at one end thereof adapted to bear against the paper 121 and record the vertical displacement of the rod 92 thereon, and has at the opposite end a pointer 126 to indicate the height of the rod 92 against the scale 128 permanently attached within said box 100. The spring 130 presses the rod 92 inwards so that the pen 124 may bear against the paper 121 and the integrating wheel 115 against the integrating disk 106.

I employ the word "indicating" to designate either showing, recording, integrating or all severally or entirely combined. I employ the phrase "meter of the venturi type" to include meters such as are used to indicate the flow of fluids through conduits in which there is inserted in the conduit conveying the fluid measured a pressure difference producer such as Venturi tube, orifice, Pitot tube or other device in which the pressure differential bears a definite relation to the rate of flow.

It is understood that my invention is not limited to the specific embodiments shown, and that various deviations may be made therefrom without departing from the spirit and scope of the appended claims.

What I claim as new and desire to secure by Letters Patent is:—

1. In a register for meters of the venturi type, the combination of a modified U-tube for containing the working liquid having means therein actuated by the height of the liquid in one leg thereof, an oscillatable spindle, an arm rigidly secured to said oscillatable spindle, a link connecting said arm with said liquid actuated means in the leg of the U-tube, indicating means for said register and means connecting said indicating means to said spindle, the link and arm being so arranged that the angle through which the spindle is turned by a definite movement of said liquid actuated means is larger at small pressure differences than at large pressure differences and the U-tube being so shaped that the movement of the indicating means is proportionate to the rate of flow.

2. In a register for meters of the venturi type, the combination of a modified U-tube for containing the working liquid, a float resting on said liquid in one leg thereof having a rod extending upwards therefrom, means in said U-tube constraining said rod to reciprocate in a vertical direction, an oscillatable spindle offset from said float rod, an arm rigidly secured to said spindle, a link connecting said rod and arm, a cam actuated by said spindle, an indicating rod mounted on said register to reciprocate in one direction, flexible means connecting said rod and cam, the link and arm being so arranged that the angle through which the spindle is turned by a definite movement of the float is larger at small pressure differences than at large pressure differences and the U-tube being so shaped that the movement of the indicating rod is proportionate to the rate of flow.

3. In a register for meters of the venturi type, the combination of a modified U-tube for containing the working liquid, a float resting on said liquid in one leg thereof having a rod extending upwards therefrom, means in said U-tube constraining said rod to reciprocate in a vertical direction, an oscillatable spindle offset from said float rod, an arm rigidly secured to said spindle, a link connecting said rod and arm, a cam actuated by said spindle, an indicating rod mounted on said register to reciprocate in one directon, a flexible band connecting said rod to said cam, the link and arm being so arranged that the angle through which the spindle is turned by a definite movement of the float is larger at small pressure differences than at large pressure differences and the U-tube being so shaped that the movement of the slidable rod is proportionate to the rate of flow.

4. In a register for meters of the venturi type, the combination of a modified U-tube for containing the working liquid having means therein actuated by the height of the liquid in one leg thereof, an oscillatable spindle, an arm rigidly secured to said spindle, a link connecting said liquid actuated means with said arm, indicating means for said register, resilient means connecting said indicating means to said spindle and means to dampen the movement of said indicating means, having one portion thereof connected to said indicating means and another portion thereof connected to another part of said register, the link and arm being so arranged that the angle through which the spindle is turned by a definite movement of the fluid actuated means is larger at small pressure differences than at large pressure differences and the U-tube being so shaped that the movement of the indicating means is proportionate to the rate of flow.

5. In a register for meters of the venturi type, the combination of a modified U-tube for containing the working liquid having means therein actuated by the height of the liquid in one leg thereof, an oscillatable spindle, an arm rigidly secured to said spindle, a link connecting said liquid actuated means and said arm, a cam actuated by said spindle, indicating means for said register, resilient means connecting said indicating means to said cam and means to dampen the movement of said indicating means having one portion thereof connected to said indicating means and another portion thereof connected to another part of said register, the link and arm being so arranged that the angle through which the spindle is turned by a definite movement of the float is larger at small pressure differences than at large pressure differences and the U-tube being so shaped that the movement of said indicating means is proportionate to the rate of flow.

6. In a register for meters of the venturi type, the combination of a modified U-tube for containing the working liquid, a float resting on the liquid in one leg thereof having a rod extending upwards therefrom, means in said U-tube constraining said rod to reciprocate in a vertical direction, an oscillatable spindle offset from said float rod, an arm rigidly secured to said spindle, a link connecting said float rod and arm, a cam actuated by said spindle, an indicating rod mounted on said register to reciprocate in one direction, flexible means connecting said indicating rod to said cam and a dashpot for said indicating rod to dampen the movement thereof, having a portion thereof connected to said indicating rod and another portion thereof connected to another part of said register, the link and arm being so arranged that the angle through which the spindle is turned by a definite movement of the float is larger at small pressure differences than at large pressure differences and the U-tube being so shaped that the movement of the reciprocable rod is proportionate to the rate of flow.

7. In a register for meters of the venturi type, the combination of a modified U-tube for containing the working liquid having means therein actuated by the height of the liquid in one leg thereof, an oscillatable spindle, an arm rigidly secured to said spindle, a link connecting said liquid actuated means and said arm, indicating means for said register, resilient means connecting said indicating means to said spindle and a dashpot having a piston connected to said indicating means and the cylinder thereof connected to another part of the register, the link and arm being so arranged that the angle through which the spindle is turned is larger at small pressure differences than at large pressure differences and the U-tube being so shaped that the movement of the indicating means is proportionate to the rate of flow.

8. In a register for meters of the venturi type, the combination of a modified U-tube for containing the working liquid having means therein actuated by the height of the liquid in one leg thereof, an oscillatable spindle, an arm rigidly secured to said spindle, a link connecting said liquid actuated means and arm, a cam actuated by said spindle, indicating means for said register, resilient means connecting said indicating means to said cam and a dashpot having a piston connected to said indicating means, and the cylinder thereof connected to another part of the register, the link and arm being so arranged that the angle through which the spindle is turned by a definite movement of the liquid actuated means is larger at small pressure differences than at large pressure differences and the U-tube being so shaped that the movement of the indicating means is proportionate to the rate of flow.

9. In a register for meters of the venturi type, the combination of a modified U-tube for containing the working liquid, a float resting on the surface of the liquid in one leg thereof having a rod extending upwards therefrom, means in said U-tube constraining said float rod to reciprocate in a vertical direction, an oscillatable spindle offset from said float rod, an arm rigidly secured to said spindle, a link connecting said float rod and arm, a cam actuated by said spindle, a rod mounted on said register to reciprocate in one direction, a band connecting said rod to the periphery of said cam, a dash pot, a spiral spring connecting the upper end of said rod to the dash pot, a rod carrying means for indicating its motion mounted in said register to reciprocate in one direction having its lower end enlarged to form the piston head of said dash pot and springs abutting the piston head of said rod and the ends of the dash pot, the link and arm being so arranged that the angle through which the spindle is turned by a definite movement of the float is larger at small pressure differences than at large pressure differences.

10. In a register of the venturi type, the combination of a modified U-tube for containing the working liquid, indicating means, means actuated by the height of the liquid in one leg of said U-tube to actuate said indicating means, resilient means connecting said indicating means to said actuating means, and means to dampen the movement of said indicating means having one portion thereof connected to said indicating means and another portion thereof connected to another part of said register, the U-tube being so shaped that the movement of the indicating means is proportionate to the rate of flow.

11. In a register of the venturi type, the combination of a modified U-tube for containing the working liquid, indicating means, means actuated by the height of the liquid in one leg of said U-tube to actuate said indicating means, a spiral spring connecting said indicating means to said actuating means and a dash pot to dampen the movement of said indicating means having a portion thereof connected to said indicating means and another portion thereof connected to another part of said register, the U-tube being so shaped that the movement of the indicating means is proportionate to the rate of flow.

12. In a register for meters of the venturi type, the combination of indicating means for said register, actuating mechanism for said indicating means having a part thereof which moves freely in substantially direct proportion to the rate of flows, resilient means connecting said indicating means with said freely moving part of said actuating mechanism and means to dampen the movement of said indicating means having a portion thereof connected to said indicating means and another portion thereof connected to another part of said register.

13. In a register for meters of the venturi type, the combination of indicating means for said register, actuating mechanism for said indicating means having a part thereof which moves freely in substantially direct proportion to the rate of flow, a spiral spring connecting said indicating means with said freely moving part of said actuating mechanism and a dash pot to dampen the movement of said indicating means having a portion thereof connected to said indicating means and another portion thereof connected to another part of the register.

14. In a register for meters of the venturi type, the combination of indicating means for said register, actuating mechanism for said indicating means actuated by the rate of flow of fluid in a conduit, resilient means connecting said indicating means with said actuating mechanism and means to dampen the movement of said indicating means having a portion thereof connected to said indicating means and another portion thereof connected to another part of said register.

15. In a register for meters of the venturi type, the combination of indicating means for said register, actuating mechanism for said indicating means actuated by the rate of flow of fluid in a conduit, a spiral spring connecting said indicating means with said actuating mechanism and a dash pot to dampen the movement of said indicating means having a portion thereof connected to said indicating means and another portion connected to another part of said register.

16. In a register for meters of the venturi type, the combination of indicating means for said register, a dash pot having two portions, means connecting one portion thereof to said actuating mechanism, means connecting the other portion thereof to said indicating means, one of said connecting means being resilient and resilient means connecting said dash pot portions.

17. In a register for meters of the venturi type, the combination of indicating means for said register, actuating mechanism for said indicating means, a dash pot having a cylinder and a piston, said piston being attached to said indicating means, resilient means connecting said cylinder to said actuating mechanism and resilient means connecting said piston with said cylinder to hold said piston centrally of said dash pot.

In testimony that I claim the foregoing as my invention I have signed my name this fourteenth day of March, 1923.

WALTER GEORGE KENT